J. P. HARRISON, Jr.
ADDING MACHINE.
APPLICATION FILED JUNE 18, 1915.

1,285,149.

Patented Nov. 19, 1918.
10 SHEETS—SHEET 1.

Witnesses

Inventor
John P. Harrison, Jr.
by Allen & Allen
Attorneys

J. P. HARRISON, Jr.
ADDING MACHINE.
APPLICATION FILED JUNE 18, 1915.

1,285,149.

Patented Nov. 19, 1918.
10 SHEETS—SHEET 2.

Witnesses:

Inventor
John P. Harrison Jr.
by Allen & Allen
Attorneys

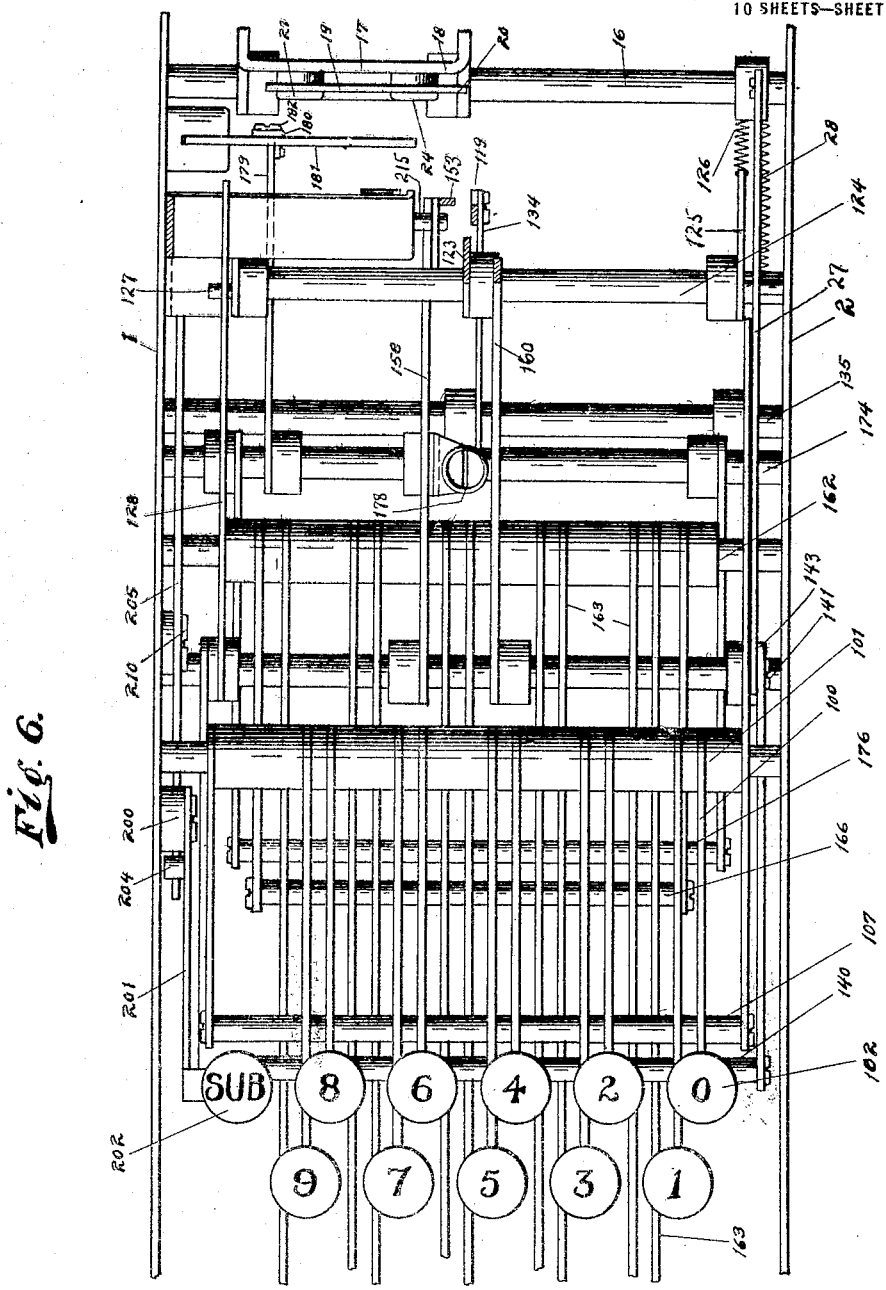

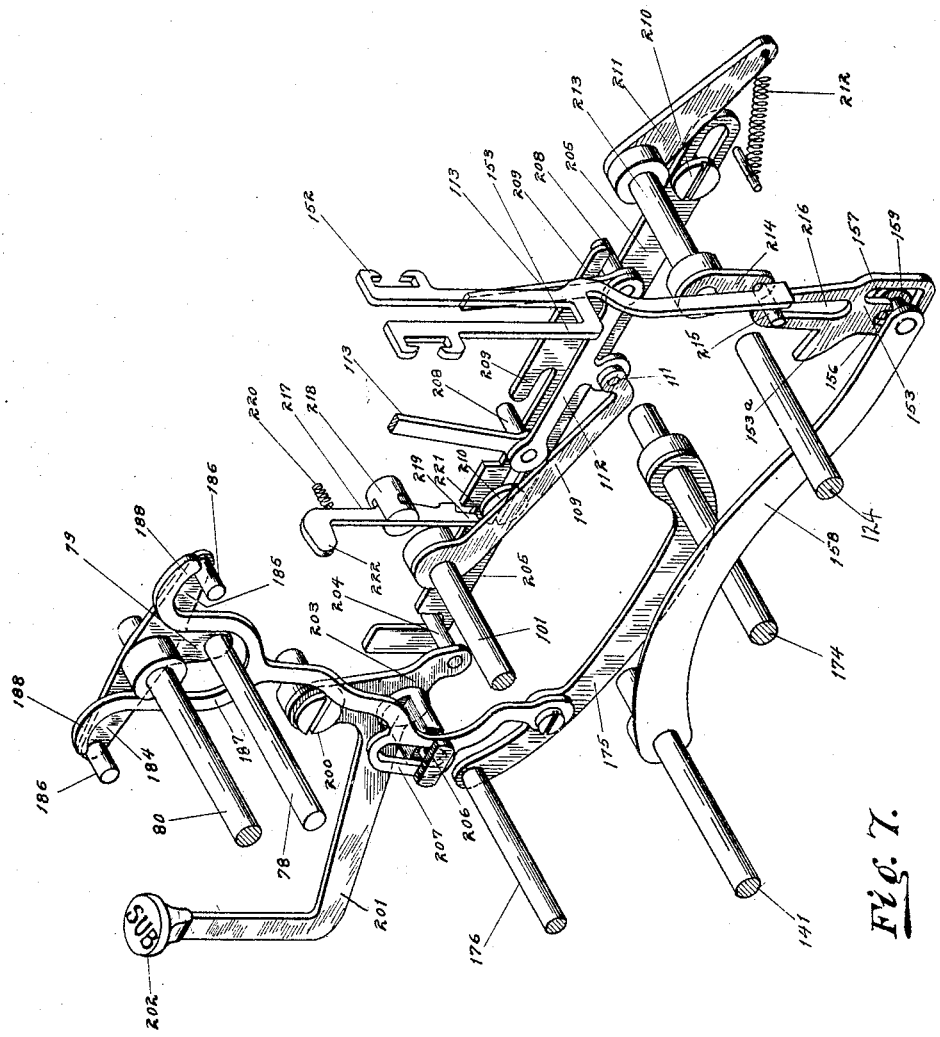

J. P. HARRISON, Jr.
ADDING MACHINE.
APPLICATION FILED JUNE 18, 1915.

1,285,149.

Patented Nov. 19, 1918.
10 SHEETS—SHEET 8.

Witnesses
Katherine Smith
Oliver Harrison

Inventor
John P. Harrison, Jr.
by Allen & Allen
Attorneys

J. P. HARRISON, Jr.
ADDING MACHINE.
APPLICATION FILED JUNE 18, 1915.

1,285,149.

Patented Nov. 19, 1918.
10 SHEETS—SHEET 9.

Witnesses
Katherine Smith
Oliver Harman

Inventor
John P. Harrison, Jr.
by Allen & Allen
Attorneys

J. P. HARRISON, Jr.
ADDING MACHINE.
APPLICATION FILED JUNE 18, 1915.

1,285,149.

Patented Nov. 19, 1918.
10 SHEETS—SHEET 10.

Witnesses

Inventor
John P. Harrison, Jr.
by Allen & Allen
Attorneys

UNITED STATES PATENT OFFICE.

JOHN P. HARRISON, JR., OF HAMILTON, OHIO, ASSIGNOR TO THE HARRISON BALANCING MACHINE COMPANY, OF HAMILTON, OHIO, A CORPORATION OF OHIO.

ADDING-MACHINE.

1,285,149.   Specification of Letters Patent.   Patented Nov. 19, 1918.

Application filed June 18, 1915. Serial No. 34,827.

*To all whom it may concern:*

Be it known that I, JOHN P. HARRISON, Jr., a citizen of the United States, and a resident of the city of Hamilton, in the county of Butler and State of Ohio, have invented certain new and useful Improvements in Adding-Machines, of which the following is a full, clear, and exact description, reference being had to the accompanying drawings, forming part of this specification.

My invention relates to adding machines wherein a series of numbers are printed on a strip of paper, and a system of counters gives a total of all numbers printed. It is the object of my invention to provide a small and inexpensive adding machine that is simple to operate and yet accomplishes all of the results of the larger and exceedingly complicated structures now on the market.

The mechanical plan of my invention is to provide a movable carriage on which the system of counters and a printing platen are mounted. A stationary gear mounted so as to mesh with the counter system is actuated from a keyboard having one key for each digit. A series of keys are also provided one for each position of the carriage, a tens key, a hundreds key, and so on. These keys move the carriage the desired number of spaces beyond the position of the stationary gear, and bring the desired counter pinion into mesh with this gear. To register one dollar, the carriage is moved so that the hundreds pinion is in mesh with the gear, and the key marked 1 is depressed, the carriage will then move one space over and two cipher keys are depressed, thus moving the carriage to nonregistering position. The printer is likewise a single reciprocating bar, operated from the keyboard, and it prints the number added on the counters on the paper strip moved along by the carriage.

The stationary gear is operated from a ratchet device that is actuated by a balanced lever, having a pawl device at each end, which is pushed upwardly when the number keys are depressed, at its central point. A sliding member is provided, having hooks to engage one end or the other of this lever, thereby causing the other end of the lever to be raised when a key is depressed, and causing the pawl at said latter end of the lever to actuate the stationary gear shaft.

This structure enables the operator to add or subtract, because one of the pawls is on one side and one on the other of the stationary gear operating device, and the stationary gear may be rotated forwardly or backwardly as desired. A transfer mechanism for the counters is provided which does the carrying of tens over from one counter to the other, in addition, and this mechanism is also adapted to be reversed when it is desired to subtract instead of add by a method of shifting the fulcrum of a forked operating member, that does this carrying over. A key marked "Subtract" is provided to accomplish these shifting operations, and when it is depressed mechanism is provided for changing the printing ribbon from black to red.

In working the device, therefore, it is intended to have the operator add on the counters and print the desired column of numbers and then depress the subtraction key and print in red and subtract the total shown on the counters. This clears the counters and brings them to zero for another operation, and gives a printed total on the paper strip. Chance of error is discounted because if the correct total is not subtracted the counters will not show at zero position.

It is thus the object of my invention to provide simple and accurate means for accomplishing the movements and operations now briefly mentioned, and it is also my object to provide devices for rotating the printing platen, and actuating the ribbon spools, and various other structures necessary in the printing operation, in a simple, automatic manner, which will be developed in the ensuing description.

The various objects are accomplished by that certain construction and arrangement of parts to be hereinafter more specifically pointed out and claimed.

In the drawings,

Fig. 6 is a plan view of the machine with the carriage and its shifting keys removed.

Fig. 7 is a detail perspective view showing the subtract mechanism and the ribbon shifting device.

Figure 1:
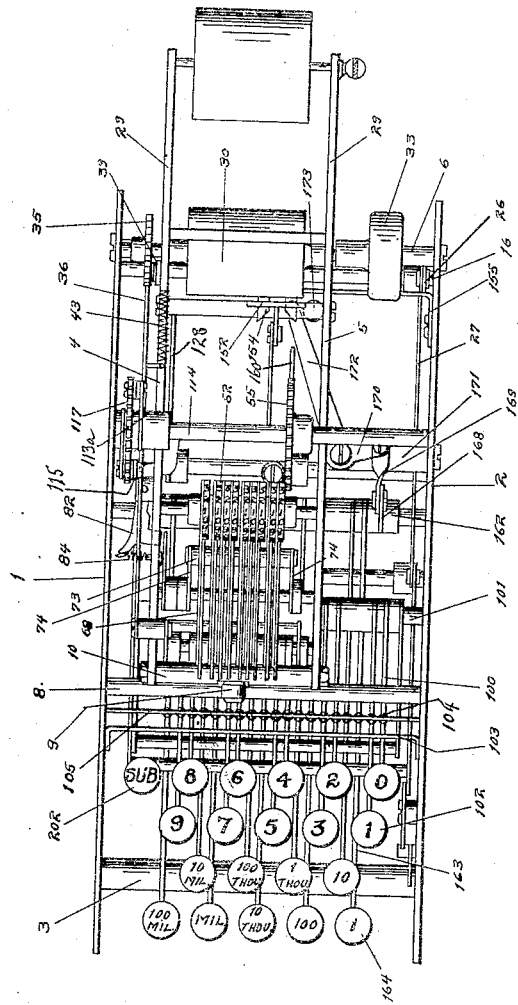
Figure 1 is a top plan view of the machine with the ribbon feed removed, and the carriage at the end of its movement.

As frame members for the machine I provide a left and a right side plate, 1 and 2 respectively, spaced apart and held together by the various shafts by which the machine is operated, and also by the two cross bars 3, 3, at the front and back and near the base of the side pieces. The machine is shown without any casing over the top, although some kind of top cover may be readily placed on the machine as will be understood without complicating the drawings to show the same.

The carriage is formed with a framework comprising two side plates 4 and 5 (left and right respectively). At the rear end a shaft 6 (Fig. 2) extends across the main framework and the two side plates of the carriage have each a collar 7 set into them which rides on this shaft. A bar 8 extends across the main frame for a front support of the carriage and a roller 9 mounted on the cross bar 10 of the carriage travels on this bar 8. To steady the carriage at the front a small hook 11 may be mounted on the cross bar 10 of the carriage to engage underneath the bar 8.

Figure 4:
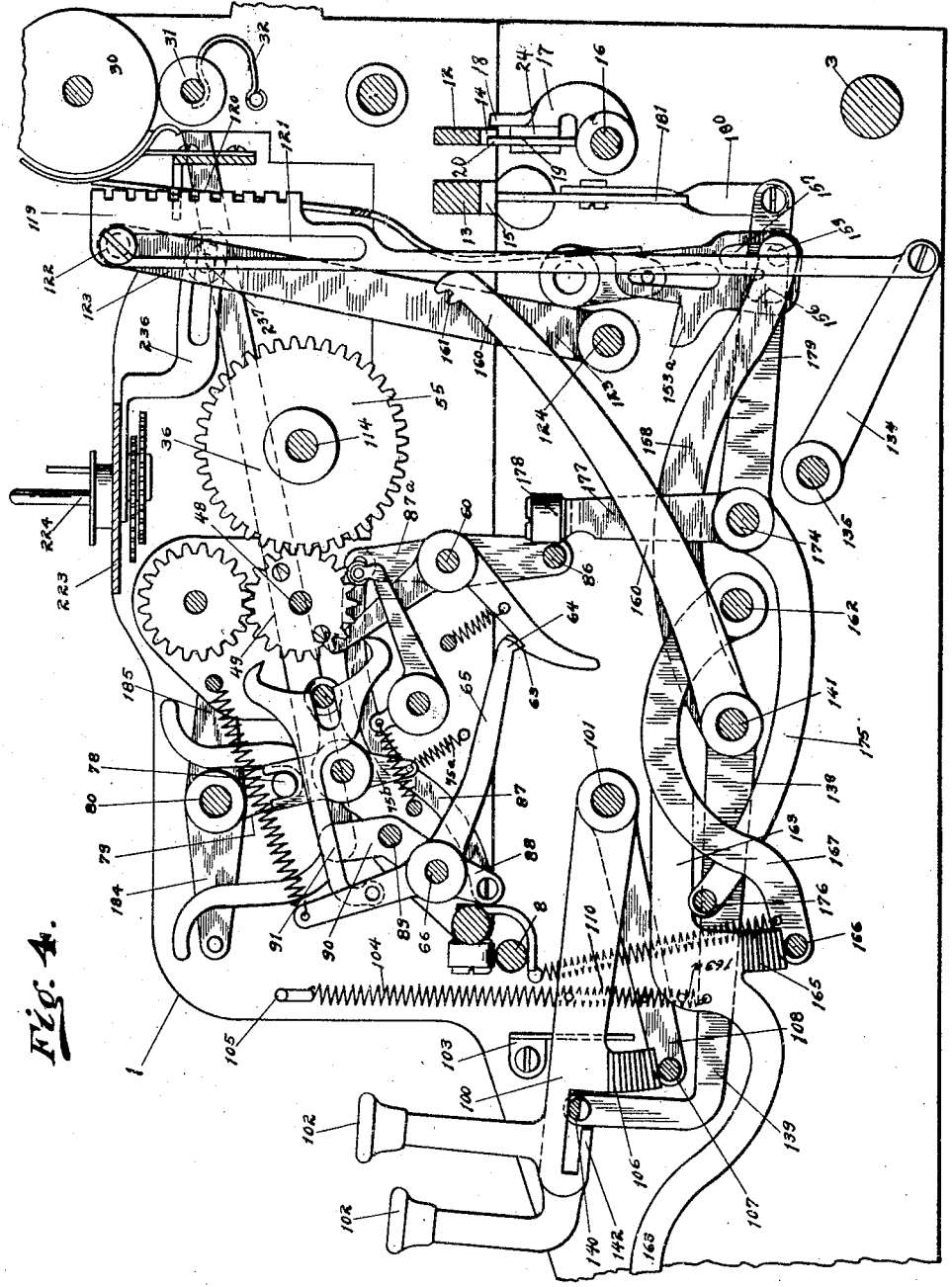
Fig. 4 is a central longitudinal section of the machine.
Figure 5:
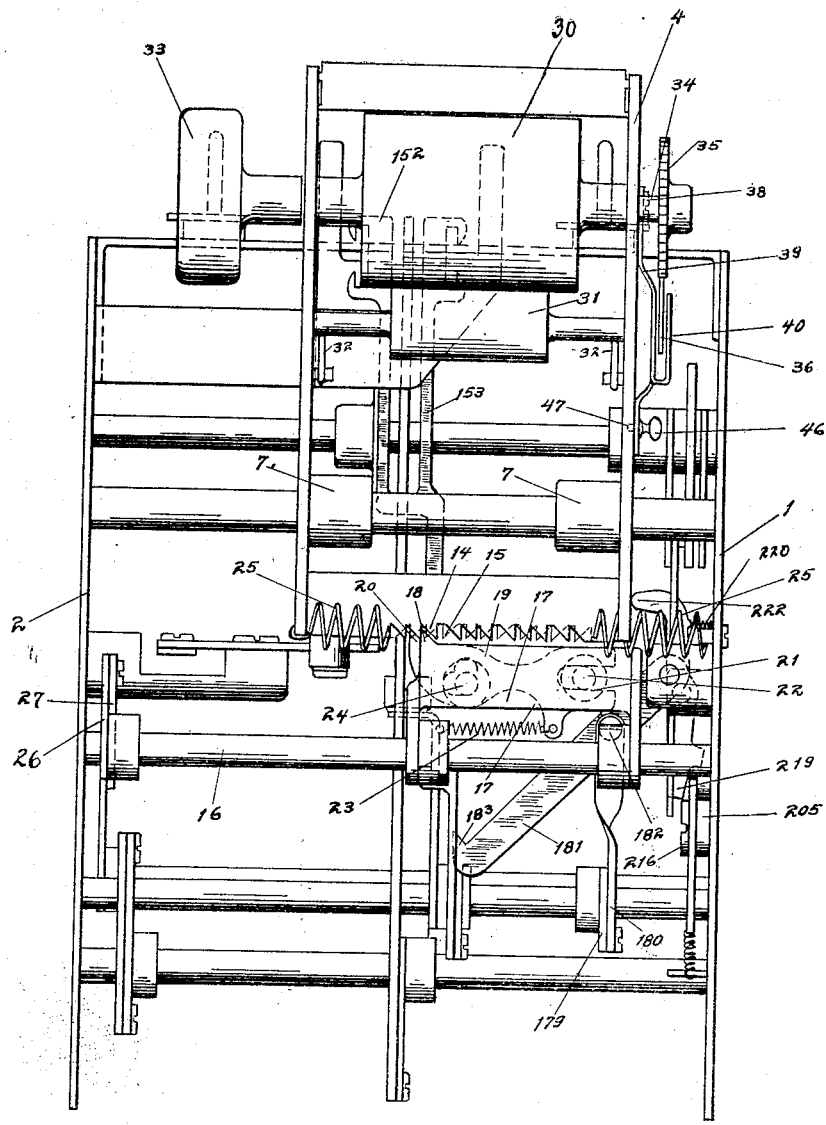
Fig. 5 is a rear elevation of the machine.

Mounted across between the two side plates of the carriage at the lower rear corner are two downwardly facing racks 12 and 13 (Figs. 4 and 5). The teeth 14 on the rearward rack have their right faces sloping and the teeth 15 on the forward rack have the sloping face to the left. A rock shaft 16 is journaled in the main frame of the machine, and carries an upwardly extending plate 17 having one tooth 18 at its right hand upper end, said tooth being sloped to the left. Carried on the front of this plate is a sliding pawl 19 having a tooth 20 at its right hand end that is similarly sloped.

This pawl has a fork 21 which slides on a pin 22 (Fig. 5), and is actuated by a spring 23. It has a wide slot on its under side engaging over a pin 24. The normal position of the plate and pawl on the rock shaft is with the tooth 18 out of engagement with the rearward rack and the pawl tooth in engagement with it. The shaft 16 when it is rocked, pushes the tooth on the pawl to a position in between the two racks, when the spring will at once pull the pawl to the right causing the tooth to engage, as the rock shaft swings over farther the next advanced tooth on the forward rack. The tooth on the plate 17 will be brought in the meantime into engagement with the rearward rack, thus holding the racks from movement during the swinging over of the rock shaft. When the shaft swings back, however, and the plate 17 resumes its normal position with its tooth out of engagement with the racks, then the carriage will be permitted to move over one notch of the racks because the pawl tooth which engages the rearward rack in normal position has advanced one step. A spring 25 secured to the carriage at the rear and to the main frame of the machine serves to pull over the carriage as soon as it is permitted to move by the devices now described. The tooth on the pawl being faced as described, will allow the rear rack member to slide over the pawl as it pivots slightly on its mounting on the two pins 22 and 24 heretofore described.

Fixedly mounted at the right side of the rock shaft 16 is a lever 26 for actuating the shaft, said lever being connected at one end to a rod 27 (Fig. 2) and at the other connected to a spring 28, which is connected to a pin on the framework. The rod 27 actuated, as will be described, pulls the rock shaft over, and the spring 28 pulls it back to normal position, thereby accomplishing a step by step movement of the carriage each time the rod 27 is pulled from the front end of the machine.

On the rear members 29 of the carriage frame is journaled the platen 30 of the printing device, having a friction roll 31, pressed against its lower surface by a spring 32 (Fig. 4), and a hand wheel 33 for turning it by hand when desired. Means will be described whereby the printing platen is turned, thereby feeding the web of paper 29ª between the platen and the roll; this paper being mounted in a roll on arms extending rearwardly from the frame.

Figure 3:
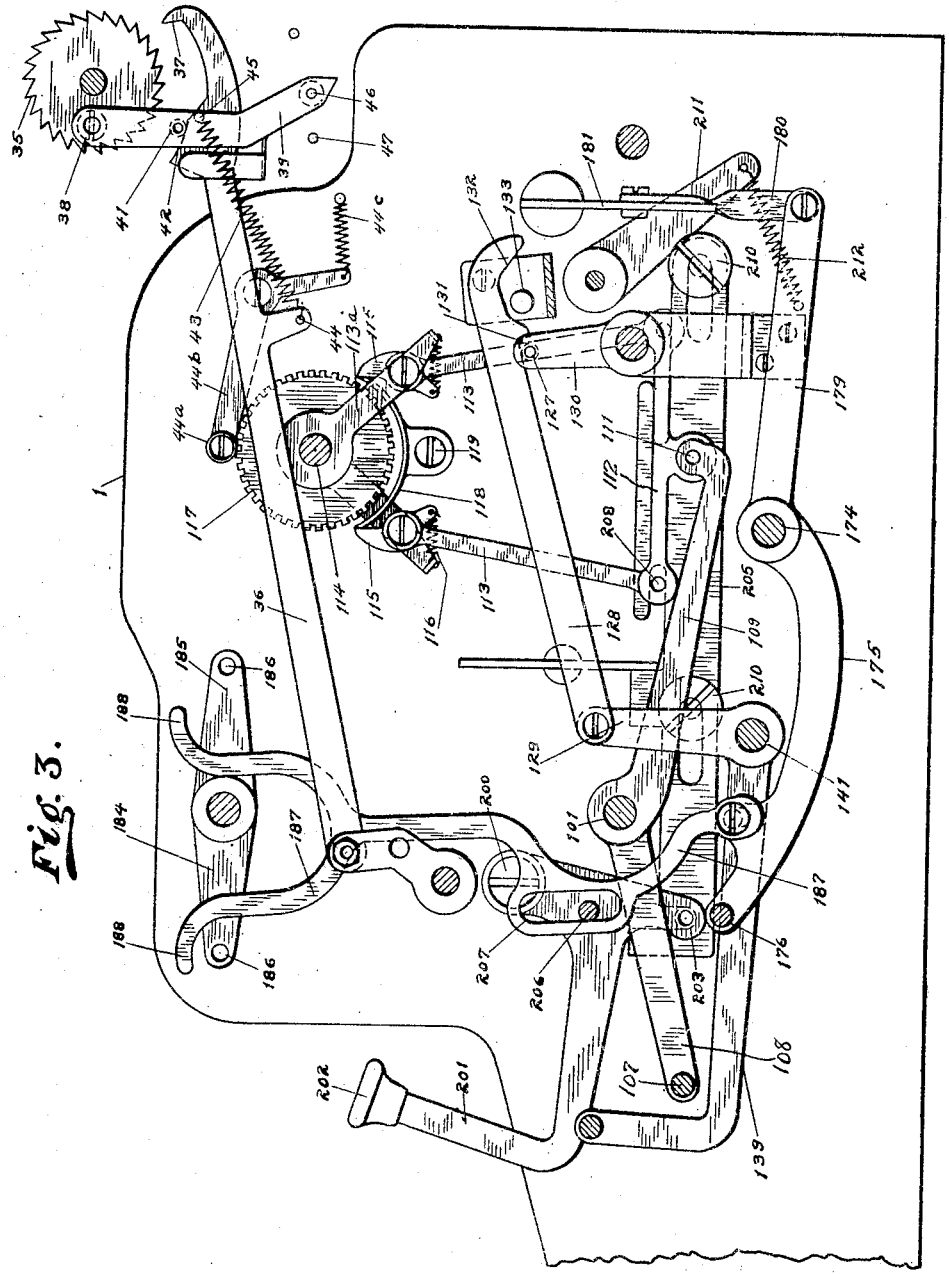
Fig. 3 is a vertical longitudinal section taken inside of the left wall of the machine, showing in elevation the parts mounted on this wall and the subtract key.

The shaft 34 of the platen has mounted at its left hand end outside of the carriage the pinion 35 (Fig. 3), by which pinion the platen is adapted to be turned each time the carriage is shifted for a new registration. A lever 36 (Fig. 3) having a hook 37 at its rearward end adapted to engage the teeth of the pinion 35, extends along the left side of the machine. Pivoted on a screw 38 (Fig. 5) is a small frame 39, which has an upwardly extending flange 40 that forms a channel for guiding the end of the lever 36. The screw 38 is secured in the side piece of the carriage adjacent to the shaft 34 of the printing platen. Mounted on this frame 39 and extending out over the top of the lever 36 is a pin 41 (Fig. 3). The lever has a cam edge 42 at the point where it lies beneath this pin, and a spring 43 connected to the lever at 44 and connected to the carriage frame 39 at 45 serves to maintain the lever 36 at its cam edge 42 in contact with the pin 41. At the lower end of the small frame 39 is located a spring pin 46 which engages a series of apertures 47 in the carriage side piece 29. By shifting the position of the small frame 39 on its mounting 38 and engaging the spring pin 46 in the desired aperture 47, the position of the pin 41 with regard to the cam edge 42 may be regulated, and the cam edge is of such a shape that in the first position of the small frame 39 the toothed end of the lever 36 will be allowed to move the platen actuating pinion only the one step, the second position of the frame 39 will allow a movement of two steps or teeth and the third position three steps. Thus the operator by shifting the lower end of the small frame 39 can regulate the spacing of the printing devices. In the description of the key operated devices for shifting the carriage, it will be developed how the lever 36 is pulled forwardly every time the carriage is shifted.

*The counters and the carrying mechanism.*

Journaled on a fixed shaft 48 (Figs. 4, 10, 11 and 12), is a series of counter pinions 49 of the number desired dependent upon the required capacity of the machine, and being nine in number in the drawings herein. These counter pinions are of identical shape and size, each having twenty teeth 50 and laterally extending teeth 51, 51, spaced ten of the teeth 50 apart, these latter teeth 51 being for the purpose of carrying over. In mesh each with its corresponding pinion 49 are a set of indicating dials 52 journaled on a shaft 54 at the front of the carriage, which are numbered on their periphery with the numerals 1, 2, 3, 4, 5, 6, 7, 8, 9, 0, appearing twice on each dial, and each dial having twenty teeth 53 to mesh with the teeth of the pinions 49.

The pinions 49 are adapted to be operated by a master wheel 55 (Fig. 4), and as the master wheel is stationary, as will be described hereafter, the spaces between the teeth 50 of the set of pinions 49 must be always in absolute alinement because they must be in mesh with the master wheel 55, and because when the carriage is moved the master wheel must pass by each one of the pinions. In order to maintain the pinions in proper alinement, a series of bell crank lever pawls 56, one for each pinion, are mounted on a fixed shaft 57 across the carriage and are held by means of springs 58 so as to force the small friction rollers at their other end into the intertoothed spaces of the pinions.

Journaled on a fixed shaft 60 across the carriage and beneath the pinion shaft 48 are a series of bell crank levers 61 having double cam ends 62 which are so pivoted as to lie with one end between each pinion, in the path of the laterally projecting carrying teeth 51. These bell cranks 61 are held in this position by the springs 62$^a$ and have notches 63 which engage the hooked ends 64 of another set of bell cranks 65 mounted at 66 in front of the bell cranks 61. When in normal position (Fig. 4), these teeth 64 and notches 63 are in engagement and therefore the upper ends of the bell cranks 65 are held in a position forwardly from the pinions 49. A set of springs 67, one connected to each bell crank 65, tend to pull the upper ends of the bell cranks rearwardly, and when one of the teeth 51 on the pinions contacts with the hooked end 62 of the first set of bell cranks, the hooked end 64 of the second set of bell cranks will be released, allowing their upper ends to be pulled by the springs 67, which movement accomplishes as will be described a movement of one notch of the adjacent counter pinion, thereby carrying from one pinion to another.

Pivotally secured along the side of each bell crank 65 is a forked sliding member 68 (Figs. 4, 10 and 11), having fingers 69, 70, positioned so that, when the bifurcated member is shifted, the position of this bifurcated member will determine which of the two fingers will contact with its counter pinion 49. The sliding members or forks are provided with slots 71 adapted to engage in the groove 72 of a grooved bar 73. When the parts are in normal position, the grooved bar will be in line with the pivotal point of the forks 68, and the shaft 48 of the counter pinions, and if the forks were caused to slide, in the absence of further adjustments, both teeth would contact with the counter pinion, resulting in no movement of it.

Means are provided for shifting the position of this grooved bar, so that it may be rocked to a position below the line above mentioned or above it, which will result in the first instance in bringing the upper finger 69 into contact with the pinion above its center and will add one, on the said counter pinion, and in the second instance in bringing the lower finger into contact and subtracting one from the said pinion.

Figure 8:
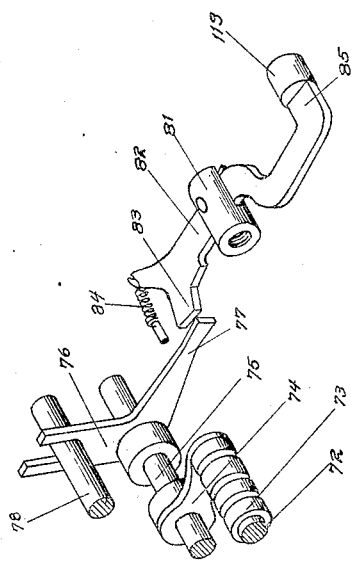
Fig. 8 is a detail perspective view of the locking means for the carrying pawls.
Figure 10:
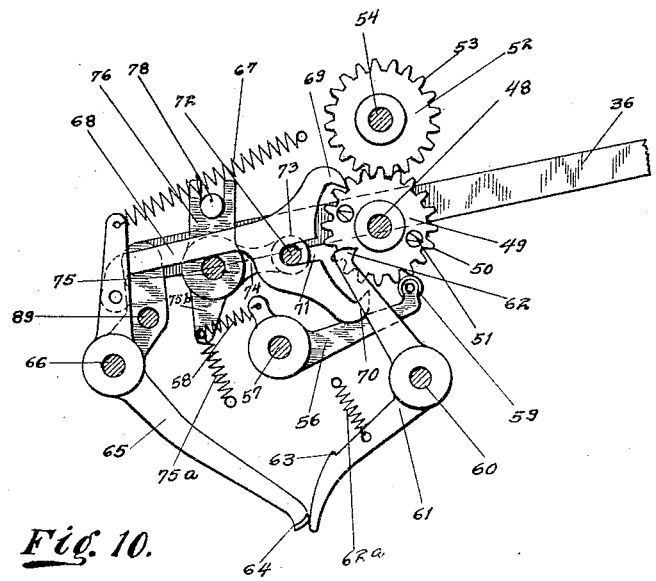
Fig. 10 is a detail elevation of the carrying device when in adding position.
Figure 11:
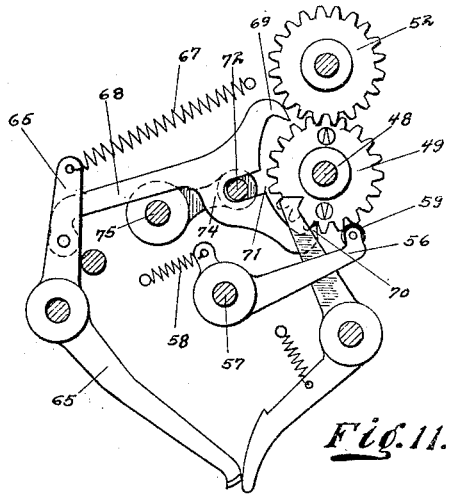
Fig. 11 is a like view with the parts in subtracting position.
Figure 12:
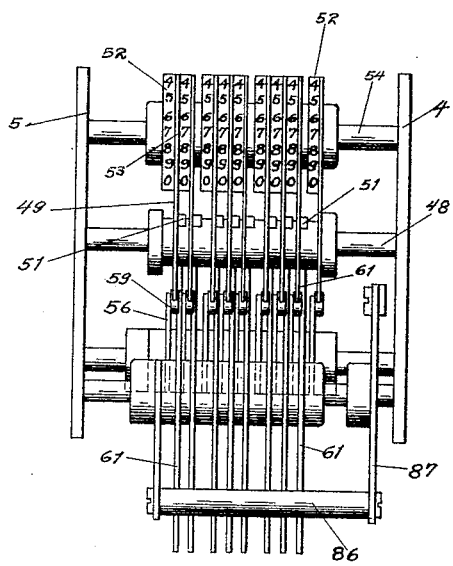
Fig. 12 is a rear elevation of the counter system.
Figure 13:
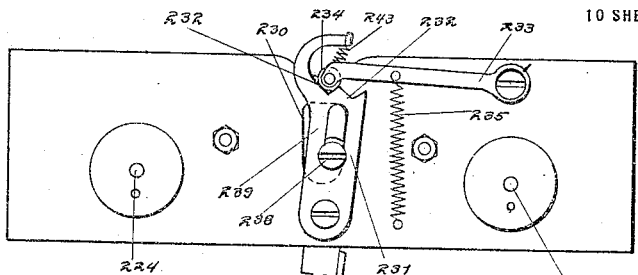
Fig. 13 is a top plan view of the ribbon feeding device.
Figure 14:
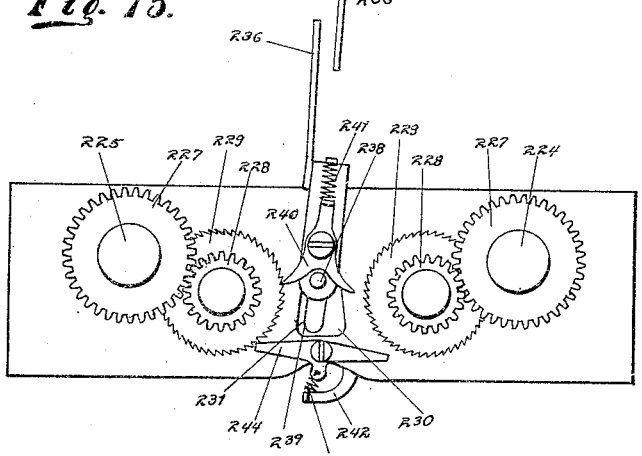
Fig. 14 is a bottom plan view of the same.
Figure 15:
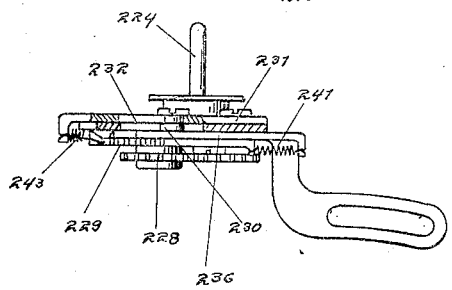
Fig. 15 is a central vertical section thereof, looking toward the left.

The bar 73 is mounted on arms 74, 74, which are fixedly mounted on a rock shaft 75 (Fig. 8), that is journaled in the sides of the carriage. The rock shaft 75 has a bell crank on its left hand end which has a forked member 76 and a member 77 to be engaged by a locking pawl. The forked end is in engagement with a cross rod 78, that is rigidly secured to the transverse rock shaft 80 by an arm 79. The transverse shaft which is operated as will be described is located at the forward upper end of the machine, and when it is rocked, the forked end of the bell crank will be swung to one side or the other, thereby causing the shifting of the bar 73 which guides the pinion operating forks as will be obvious without following out each interconnecting member.

The carriage carries on its left side a stud 81 (Fig. 8) in a slot of which is pivoted a latch member 82, having a finger 83 which is held by a spring 84 in the path of the movement of the end 77 of the rocking bell crank last mentioned. When the carriage is at the extreme left which will be when it has reached the end of its movement after a registration, the other end 85 of this latch member will come into contact with the mounting screw at 119 to be hereinafter mentioned (Fig. 3). This will swing the finger 83 of the latch out of the path of the bell crank end 77, and the bell crank is free to move. As soon as the proper movement of the bell crank has been accomplished which will determine whether the carrying mechanism is to add or subtract, the carriage is then to be moved as will be described, which will release the latch and enable it to swing across the end of the bell crank, thereby locking it in the desired position until the carriage has moved entirely back to the left again. A spring 75$^a$ connected to the arm 75$^b$ on the shaft 75, returns said shaft to normal position.

Fixedly mounted at the ends of the rock shaft 60 (Fig. 4) is a bail 86 which is adapted to be swung by means of a member to be described later, said bail having an upwardly extending arm 87$^a$ pivotally connected to a bent link 87 that extends forwardly where it is pivotally connected with an arm 88. The arm 88 is connected with a short bail 89 that is mounted on the shaft 66 of the fork carrying bell cranks 65, and the bail extends upwardly so as to contact with the upper arms of said bell cranks. When this set of interconnecting members is actuated from the bail 86, the bail 89 will be caused to press forwardly the bell cranks 65, thereby causing their ends 64 (Figs. 10 and 11) to become locked behind the teeth 63 of the pinion operated bell cranks 61.

Rigidly connected to the short bail 89 is an arm 90 which has pivotal connection at 91 with the long arm 36, which it will be remembered, operated the printing platen, causing it to rotate. The movement of the small bail will pull forwardly this arm 36 and thereby cause the finger 37 at its rear end to actuate the pinion 35.

The parts will be hereinafter described which cause the carriage to move, and it is these parts which accomplish the movement described in the last two paragraphs, and it is thus to be appreciated that at the time of moving the carriage, the carrying mechanism will be returned to intermeshing position, with the fingers 69, 70 on the fork 68, in a position to either add or subtract, and that the printing platen will be caused to rotate, thereby bringing fresh paper forward to receive a new impression of another numerical item to be printed and registered.

*The master wheel operating mechanism.*

Mounted in staggered relation at the forward end of the machine are a series of key levers 100, which are pivoted on a common shaft 101 and turned upwardly at the front of the machine where they are provided with keys 102 which are numbered from left to right and in staggered relation from zero to nine (Fig. 1). A slotted plate 103 and having ten slots in it, is set over the key levers and serves as a guide for them. Each key lever has a spring 104 connected to it, which springs are connected to a common cross bar 105 and serve to retain the keys in a normal position at the top of the slots in the plate 103.

Dependent from each of the key levers and in alinement with each other, are a series of tongues 106 (Fig. 4) which actuate the master wheel operating mechanism. Located across the frame beneath this series of tongues is the lateral member 107 of an operating bail 108. The bail is pivotally mounted on the shaft 101 which supports the key lever and extending from the left hand of the longitudinal member of the bail is an arm 109. This bail is maintained with its forward end up by the springs 110 likewise connected to the cross member 105 which holds the springs of the key levers. The downward movement of each key is limited as will be described. The length of the tongue 106 on the key lever will determine the distance which the bail 108 is rocked and accordingly the distance upwardly which the rear end of the arm 109 will be moved.

The arm 109 is pivotally connected at 111 with the central portion of a pawl carrying bar 112. At each end of this pawl carrying bar is an arm 113 which extends upwardly (Fig. 3) where it is pivotally connected to an arm 113$^a$ that is pivoted on the shaft 114 of the master wheel 55. Mounted on the end of each arm 113 is a pawl 115 which is normally pulled by a spring 116 into contact with a pinion 117 that is fixedly mounted on the shaft 114 of the master wheel. One of the arms 113 extends up on one side of the pinion 117 and the other on the other side of this pinion, and when the pawl carrying bar 112 is in inactive position, both of the spring pawls 115 will lie behind a segmental guard plate 118 which is mounted at 119 to the side frame piece.

Pivotally mounted on the side of the case is an arm 44$^b$ carrying a roller 44$^a$ which rests between the teeth of the pinion 117, the arm being kept in tension by the spring 44$^c$ attached to the heel of the arm 44$^b$. The purpose of this device is to maintain the alinement of the master wheel on the shaft 114 with the counter pinions 49 during the operation of the machine and to prevent the pawls 115 in their return movement from disturbing the position of the pinions.

It can be seen that if one end of the pawl carrying bar should be retained and the other allowed to swing and the bar 109 actuated to push upwardly on the pawl carrying bar, then the free end of the pawl carrying bar will rise and its pawl will be brought into contact with the pinion 117, thereby causing the shaft 114 and the master wheel fixedly mounted thereon to rotate. Mechanism which is provided for this purpose will be described under the head of subtraction mechanism.

*The printing mechanism.*

Figure 9:
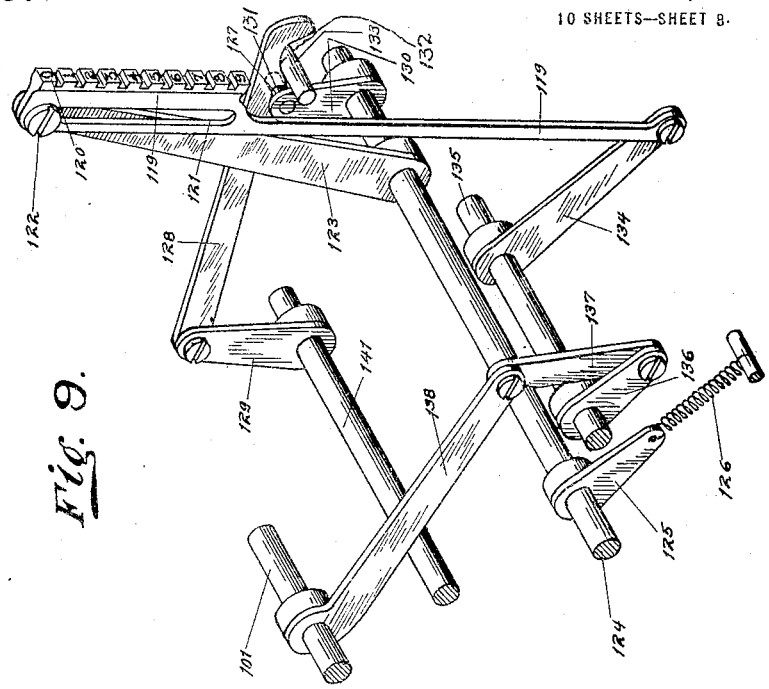
Fig. 9 is a like view of the printing arm and its operative connections.

The value keys also operate a printing mechanism which operates against the printing platen already described each time a value key is depressed. A vertical printing bar 119 is provided, having a vertical set of type 120 for the numerals 0, 1, 2, 3, 4, 5, 6, 7, 8, 9, with the 0 at the top and the 9 at the bottom (Figs. 3 and 9). This bar has a long slot 121 by means of which the bar slides on the pin 122 secured at the upper end of a swinging arm 123.

The arm 123 is mounted on a rock shaft 124, which shaft has a small arm 125 at its right hand end which is under pressure of a spring 126. At the left hand end of the shaft 124 is an arm 130 which is fixed on the shaft and has a laterally extending pin 127. A long bar 128 which is pivotally connected at its forward end with an arm 129 which arm is fixed upon a rock shaft 141, the actuation of which will be hereinafter detailed, is employed to pull over and then release the pin 127 on the arm 130 above mentioned. This will cause the type bar, whose adjustment will be described, to be first drawn forwardly and then released when the spring 126 will cause it to strike the printing platen.

To accomplish the pulling over and releasing of the pin 127, the bar 128 is notched at 131, to engage the pin. At the end of the bar is formed a cam edge 132 which slides over a fixed pin 133 on the left wall of the machine. As the bar is drawn back by the rocking of the shaft 141 the cam will ride upon the pin until the notch 131 is lifted off of the pin 127. The parts are so positioned that this does not happen until the type bar has been elevated to the position for printing and the drawing backwardly of the swinging arm 123 on which the type bar is slidably mounted operates the ribbon feeding devices as will be detailed hereinafter.

The type bar is raised by means of an arm 134 which is mounted on a rock shaft 135 (Figs. 6 and 9). The shaft 135 is caused to rock by means of a compound lever having members 136, 137 and 138 respectively. The lever member 138 is fixedly secured on the shaft 101, which it will be remembered is the shaft which operates the counter turning devices and whereon the levers for the value keys are loosely mounted. Each time a value key is depressed, the rock shaft 101 is moved a distance dependent upon the length of the graduated tongue 106 of the value key lever. The parts of the printer are so proportioned that when the key 9 is depressed on the keyboard the type bar at the rear of the machine will be raised on its slidable mounting sufficient distance to bring the type "9" opposite the printing point on the platen 30, and the cam and pin that release the arm 123, are so arranged that this will not be done until the value key has been depressed so as to move the bail 139 down as far as it will go.

Figure 2:
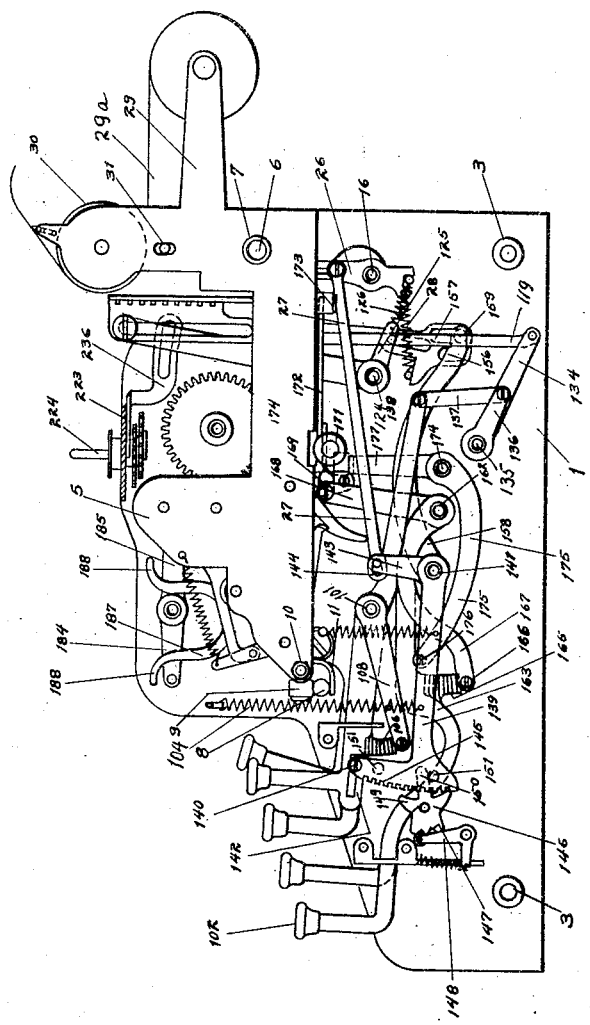
Fig. 2 is a right side elevation of the machine with the side plate removed so as to show the carriage and the various operating yokes and levers.

The means for operating the carriage release, which comprises devices for pulling over the rod 27, as mentioned above when describing the depending double racks at the rear of the carriage, and which results in a step by step movement of the carriage, will now be described. At the front of the machine is mounted a bail 139 having a transverse member 140, said bail being mounted on a shaft 141 (Figs. 2 and 4). Each value key has a hook 142 which forms an L-shaped slot at the under side of said levers. When a lever is depressed, the transverse member of the bail 139 will ride into the slot and when the lever rises up again by means of its spring, the bail will be released. However, when the bail is partially depressed, the key lever is tightly held so that it must follow the full stroke of the bail which will be inforced as described below.

When the bail is depressed, it will rock its shaft 141. Mounted on the shaft is a lever 143 (Fig. 2) which has a pin engaging a slot 144 at the forward end of the rod 27. This will, as soon as the key has nearly reached the lowest point of its movement, impart a pull to the rod 27, thereby throwing over the carriage releasing pawls, which as soon as the key is released will allow the carriage to move one step. The spring 28 working counter to the rod 27 as was described above, will accomplish this by pulling over the pawl shaft as soon as the bail and its shaft are allowed to return to position such that the rod 27 will not be positively engaged.

The means to enforce a full stroke of the bail 139 by employing a full stroke pawl will now be described. At the right hand side of the bail is mounted a segmental rack 145 (Fig. 2) and mounted on a suitably placed pin in the right hand framework, is a double pawl 146. Two notches 147 at the forward end of this pawl are engaged by the roller end of a bell crank 148. The bell crank is spring-pressed against the pawl and its end will lie in either one of the two notches. The pawl is so positioned that one or other of its teeth 149 will engage the rack 145 aforementioned. When the rack is moving downwardly and the lower pawl tooth is in engagement with the rack, then no upward movement of the rack is possible, and when the rack is moving upwardly with the upper tooth in engagement there will be no downward movement possible. The pawl is shifted so that the proper teeth are presented to enforce full upward or downward movement, by means of an arm 150 on the pawl which lies along the left hand side of the rack so as to be engaged by the pins 151, 151, located on the rack which, at each end of the rack movement, will throw the pawl so that the proper tooth is in engagement.

The ribbon guide.

The ribbon guide is also operated from the shaft 141 of the bail 139 (Figs. 1, 2, 4 and 7). The guide 153 which has an upper end 152 of the usual construction to guide a two color ribbon, is arranged to slide in any desired guide 154 (Fig. 1) which is secured to the right side of the machine by a bracket 155 arranged so as to clear the carriage in its movement. On the lower end of the guide is an expanded end having a short slot 156 and a long slot 157 (Figs. 2, 4 and 7), these two slots being in communication with each other at their lower ends. Extending from the rock shaft 141 is a curved arm 158 which has a pin 159 on its rearward end to lie in the slotted formation 156, 157.

When the rock shaft is actuated, the arm 158 will raise the guide a distance dependent on the slot with which the engaging pin is in line, and the ribbon will be raised to be engaged by the type on the type bar, either a short distance to cause a printing of one color or a long distance to cause a printing of the other, on the two color ribbon.

Projecting forwardly from the guide bar 153 is a shoulder 153ª which, as the guide is raised when printing black, at the limit of the throw contacts with the rock shaft 124 serving as a stop to prevent overthrow.

The expanded lower end of the guide is provided with means for shifting it forward or rearward to effect the desired alinement of the actuating pin 159, on said link, which means is connected to the subtract mechanism and will be described in connection therewith.

The master wheel stop.

A means is provided for positively stopping the master wheel from overthrowing or making an excessive registration on the counters (Fig. 4). Mounted on the shaft 141 of the value key bail 139 is an arm 160 having a finger 161, said arm being so positioned that its finger will be swung into mesh with the master wheel as soon as the bail 139 has been depressed to the full extent of its movement.

The movements of the machine which are dependent on the value keys for their initial movement have now been described, and it is desired in the next place to describe the order keys by which the carriage is positively moved with relation to the master wheel.

The order keys for setting the carriage.

Loosely mounted on a shaft 162 located near the middle of the machine, are a series of key levers 163 of sizes so as to present their forward ends in staggered relation (Figs. 1 and 2). At the front they extend upwardly and have mounted at their upper ends the order keys 164 properly marked for the spaces that the carriage is to be moved. In the example shown in the drawings, there are nine of these levers and keys, one for each counter, and these levers are returned to normal position after operation by the springs 163ª.

The levers are provided with graduated depending tongues 165, as in the case of the value keys, and these tongues contact with the transverse member 166 of a bail 167. The bail is mounted fixedly on the shaft 162, where the key levers are loosely mounted, and when the bail is depressed this shaft is adapted to rock, it being evident that the length of the graduated tongue on any key lever will regulate the amount which the shaft is rocked.

Mounted fixedly on the shaft is an upwardly extending lever 168 (Figs. 1 and 2), which lever is connected by a link 169 with a bell crank 170. The bell crank is pivoted on a small bracket 171, that extends out from the right hand wall of the machine, and its long end 172 is so positioned that it will contact with a post 173 depending from the right hand end of the carriage. When the shaft is rocked, the bell crank will be pulled, the arm 172 thereof swept across the machine and the carriage moved over a distance dependent upon the amount that the shaft is rocked, or in other words upon the key that has been depressed.

Mounted on another rock shaft 174 is another bail 175, having a transverse member 176 located beneath the inner ends of the order key levers (Figs. 2 and 4). This bail is depressed the entire stroke of each lever, there being no graduation in connection therewith, and mounted on the rock shaft there is an upwardly extending arm 177 having a contact member 178 that lies adjacent to the transverse bail member 86 heretofore mentioned. It will be remembered that this bail member operates the devices on the carriage which return the various carrying pawls after a registration has been completed and which operate the devices for line spacing the movement of the printing platen.

The shaft 174 extends across the machine as do all the bail shafts and mounted on the shaft 174 at the left hand side of the machine (Figs. 3 and 4), is a lever 179. This lever (Fig. 5) has mounted on it an upwardly extending link 180 which is pivoted at 182 to a stop pawl 181. This pawl has a tooth 183 adapted to engage the teeth 15 of the downwardly depending rack 13. The pawl is so positioned that at the bottom of the stroke of the order keys it will come into mesh with the said rack, thereby preventing overthrow of the carriage, and preventing an excessive operation of the order keys. The depression of the desired order key will, therefore, cause the carriage to swing over a regulated distance, when the pawl device 19 (Fig. 4), heretofore described with regard to the carriage spacing devices, will catch the rack member 12, thereby holding the carriage against release, and when the overthrow preventing pawl 181 last mentioned will stop any excess movement in the opposite direction. The pawl 19, it will be remembered, is spring-mounted so that the teeth 14 of the rearward rack can pass it in a reverse direction.

It will be remembered that in shifting the carrying devices from add to subtract position, mechanism was described whereby the carrier forks were moved to one side or the other of a center, and mechanism for locking these shifting means. It will be recalled that these devices were operated by the rocking of a shaft 80 at the forward end of the machine, upon which was mounted a depending arm 79. On this shaft 80 is mounted a T-shaped piece of which the depending arm 79 is a member and which has the extending arms 184, 185 (Figs. 3, 4 and 7). These two arms have laterally extending pins 186 on them and a forked member 187, having hooks 188 at each end of the fork is provided to pull down one arm or the other. The forked member is pivotally mounted on the bail 175 of the order keys, and when the bail is depressed, the fork is pulled down engaging one end or the other of the T-piece above mentioned, thereby rocking the depending member 79, and shifting the carrying mechanism. The subtract key and its interconnected parts serve to shift the fork to one side or the other so that it will, when pulled down by the order key bail, hook over the desired side of the T-member. This mechanism will be described under the head of the subtract key, and it will be understood that the subtract mechanism is to be returned after one operation of the carriage to normal position, and that this normal position will be such that the fork 187 will, unless moved by the subtract keys, be in a position so that the end 184 of the T will be pulled down, thereby throwing the carrying devices to adding position.

*The subtract key and parts.*

Pivotally mounted at 200 to the left side of the machine is the subtract lever 201 which has a key 202, marked "Sub." (Figs. 1, 3 and 7). The lever 201 is in nature a bell crank, and has at the end 203 thereof a laterally extending pin 204, which engages a sliding bar 205 that extends from front to rear along the left hand side of the machine.

Mounted on the right hand face of the lever portion 203 is a stud 206, having a suitable head, and adapted to slide in a slot 207 in the fork 187 that was described last above. When the subtract key is depressed, the stud 206 will move the fork member a short distance rearwardly, and this will be sufficient to shift its rearward fork into position to pull down on the side 185 of the T-piece above described (Fig. 7). This pull as will be remembered, is to be accomplished by the order key bail 175, and the fork is permitted to slide because of the slot 207 which permits the subtract lever to shift the position of the fork without disturbing its motion otherwise. When the subtract key is in normal position it will leave the parts so that the end 184 of the T can be depressed (Fig. 3) to add position.

Under the description of the pawl carrying bar 112 which supported the pawls which operated the master wheel, thereby working the counters, it was mentioned that means were to be provided for holding pivotally one end of the bar or the other which would determine which of the pawls 115 thereon (Fig. 3) would contact with the master wheel operating pinion. It will be remembered that one pawl was on each side of this pinion and accordingly that to hold the rearward end of the pawl carrying bar would cause the master wheel to subtract on the counters, and to hold the forward end would cause it to add.

The pawl carrying bar for the above purpose is provided with pins 208, and the sliding bar 205 is provided with a T-shaped plate 209, located adjacent to these pins so that when the bar is caused to slide rearwardly it will hook over the rearward pin, causing the master wheel to subtract. The bar is mounted by means of slots and studs 210 and the pin 204 on the subtract lever will push or slide the bar rearwardly when the subtract key is depressed.

At the rear end of the bar it is arranged to contact with a lever 211 which is pulled forwardly by a spring 212. This lever will therefore serve to push the sliding bar into a normal forward position, or into an "add" position. The lever is mounted on a rock shaft 213 that extends partway across the machine and has at its inner end a lever and a pin 214, 215, respectively. The pin 215 causes the shifting the ribbon guide from its one position to another in the same way as the forked member at the front was shifted. A slot 216 in the expanded end of the guide 153 engages over the pin and the swinging of the pin will cause the end of the ribbon guide to shift so that it will have its short slot 156 in engagement with the guide raising device, instead of the long slot, thereby resulting in a printing of a different color when the subtraction key is depressed. The spring 212 on the lever 211 will serve to return the ribbon guide as well as the sliding bar 205 to normal "add" position.

A lock is provided for the sliding bar 205, which comprises a vertically pivoted latch 217, mounted in a slotted stud 218 located on the left side wall of the machine. The finger 219 of this latch is spring-pressed by the spring 220 so as to lie in the path of the sliding bar, which bar has a tongue 221, on either side of which the finger 219 may engage. If the finger engages the forward end of the tongue the sliding bar will be held against spring-pressure at 212, in subtract position (Fig. 7). When the carriage is at its extreme left hand position, which will be after the end of a registration, it will contact with the extension 222 at the upper end of the latch, and release the sliding bar when it will at once return to add position.

When the subtract key is depressed, the order key must then be depressed, so that the carriage when it releases the latch will enable the latch to engage with the forward end of the tongue 221.

The ribbon feed.

Means are adopted for feeding the ribbon which are actuated by the type bar actuator, which it will be remembered was drawn back and released by each depression of a value key. Mounted on a plate 223 across the top of the machine are the spindles 224, 225, for printing ribbon spools. These spindles have on the under side of the plate pinions 227, 227. The pinions 227 are in mesh with pinions 228, which are mounted on the under side of the plate so as to revolve in unison with the pinions 229, 229.

A slot 230 is formed at the middle of the plate, having the forward end broader than the rear. Pivoted at the rear end of this slot is a slotted plate 231, having at its forward end two teeth 232. A small lever 233, pivotally mounted on the top of the plate to one side, has a roller 234 adapted to mesh with one or the other of the two teeth above mentioned. The roller is pulled by the spring 235 into frictional contact with either tooth, so that to cause the plate 231 to swing from one tooth to the other will call for a slight strain.

Extending forwardly from the arm that is employed to operate the type bar is an arm 236, said arm 236 having slotted connection 237 with the type bar arm so that it will be pushed forwardly by said arm only when the type bar has been drawn back ready to strike. The arm 236 passes beneath the plate 223 on which the ribbon feed is mounted, and has a stud 238 on its upper side to slide in the slot 239 in the pivoted plate 231 heretofore referred to. On the under face of the arm at this point is a double pawl 240, held in a longitudinal position with regard to the plate by a spring 241.

The slotted plate 231 has an arm 242 extending around the forward end of the mounting plate 223 where it is connected by a spring 243 with a pivoted double ratchet pawl 244. When the plate 231 is moved into left or right hand position under the engagement of its spring-pressed frictional roller, this will draw the ratchet pawl to the same direction, thereby preventing back movement of the pinions which are under operation of the double pawl 240 as will be described.

The arm 236 when caused to operate by the type bar devices as described, will move the pawl 240 so that one or other of its teeth, dependent on the position of the slotted plate 231, will work against a pinion 229. When one of the pinions 229 is prevented from operating by reason of the complete unwinding of the ribbon on the opposite spool, and the double pawl 240 cannot for this reason complete its forward movement, then the pressure on the plate 231 will cause it to swing over in spite of the friction roller 234, so as to bring the other tooth at the end of the plate 231 into mesh with said roller 234. This will accomplish a shifting of the ribbon feed so that it will be wound from the first spool onto the second or vice versa, and as can be seen this is a purely automatic reverse.

Conclusion.

The various features of my adding machine have now been described in detail, with running comment as to its relation to the other parts of the machine. In view of the fact that the parts are numerous, it is not believed to be necessary to supplement the detail matter with any general statement of the operation of the various parts, as the general scheme was outlined in the introductory matter. The parts, although numerous, are relatively few compared to most adding machines now on the market. The devices for positively shifting the carriage relieve the operator from the necessity of manually moving the carriage to starting position as is usually necessary in adding typewriters. The fixed, but reversible master wheel is believed to be new with applicant as are various other features which are broadly claimed in the ensuing claims, it being desired to include in such claims the full range of equivalents, notwithstanding that equivalent structures have not been pointed out in the above matter.

Having thus described my invention, what I claim as new and desire to secure by Letters Patent, is:—

1. In a device of the character described, in combination with a counter mechanism and a movable carriage therefor, counter operating mechanism, value keys, a pinion for operating the counter operating mechanism, a pawl carrier having pawls to engage both sides of said pinion, interconnecting mechanism between the value keys and the central portion of the pawl carrier, and shiftable means for retaining one end or the other of the pawl carrier, for the purpose described.

2. In a device of the character described, in combination with a counter mechanism and a movable carriage therefor, a counter operating mechanism, a set of value keys for actuating the counter mechanism, means for moving the carriage, shiftable mechanism intermediate said keys and the operating mechanism for transmitting forward or reverse movement thereto upon the depression of the value keys, carrying mechanism intermediate the counters, and mechanism set by the shiftable mechanism and actuated by the means for moving the carriage for shifting the carrying mechanism for forward or reverse movement.

3. In an adding machine, a set of value keys, a counter actuating member, graduated operating members for the keys positioned to engage the actuating mechanism, an additional member common to all the keys arranged for engagement with each key equally, and a positive stop for the counter mechanism operatively connected to the additional member, whereby upon full depression of any value key the counter will be stopped against movement under the actuation of any other key.

4. In an adding machine, a set of value key levers, a counter mechanism, a master pinion for actuating the counter mechanism, means for operating the master pinion, graduating operating members for the value key levers with the master pinion operating mechanism, a transverse member lying across beneath the key levers, and a positive stop for the master pinion operatively connected to the transverse member, whereby upon full depression of any value key the said pinion will be stopped against movement under the actuation of any other value key.

5. In an adding machine, a set of value key levers, a counter actuating member, graduated operating members for the key levers operatively contacting with the actuating mechanism, a transverse member lying across beneath the key levers, a full stroke pawl for enforcing complete movement of the transverse member, and a positive stop for the counter mechanism operatively connected to the transverse member, whereby upon full depression of any value key the counter will be stopped against movement under the actuation of any other key.

6. In an adding machine, a set of value key levers, a counter actuating member, graduated operating members for the key levers operatively contacting with the actuating mechanism, an additional member arranged for contact with each key lever equally, a full stroke pawl for enforcing complete movement of the additional member, hooks for connecting a depressed key lever with said member and drawing it into the path of the other key levers, and a positive stop for the counter mechanism operatively connected to the additional member, whereby upon full depression of any value key, the counter will be stopped against movement under the actuation of any other key.

7. In an adding machine, a set of value key levers, a counter mechanism, a master pinion for actuating the counter mechanism, means for operating the master pinion, means for graduating the operation of the value key levers with the master pinion operating mechanism, an additional member arranged for contact with each key equally, a full stroke pawl for enforcing complete movement of the additional member, hooks for each key to engage over the said additional member upon slight depression of the key, and a positive stop for the master pinion operatively connected to the additional member, whereby upon full depression of any value key the said pinion will be stopped against movement under the actuation of any other value key.

8. In an adding machine, a movable carriage, a set of order keys, mechanism for moving the carriage, means for graduating the operation of the keys, said means operatively connected with the carriage moving mechanism, a transverse member arranged beneath the key levers, and a positive stop for the carriage operatively connected to the additional member, for the purpose described.

9. In an adding machine, a movable carriage, a paper feeding mechanism thereon, a set of order keys, mechanism for moving the carriage, contact members of graduated sizes for the keys positioned to contact with the carriage moving mechanism, an additional member arranged for contact with each key equally, and a positive stop for the carriage operatively connected to the additional member, and means operatively connected to the paper feeding mechanism from said additional member, for the purpose described.

10. In a device of the character described, in combination with a counter mechanism, and an operating mechanism therefor, a bar, elements on each end thereof for actuating the operating mechanism, value keys operatively connected to said bar between the actuating elements, and selective means for holding fixed either end of said bar, for the purpose described.

11. In a device of the character described, in combination with an actuating shaft for an adding and subtracting register, operating elements for said shaft, arranged to move radially with regard thereto, an operating bar for said elements, a means for moving the bar toward the shaft, connecting means between the ends of the bar and the elements, and means for holding one of the ends of the bar stationary, for the purpose described.

12. In an adding machine, a counter element and an operating element movable with relation to each other, selective means for controlling the operation of the operating element for addition and subtraction, and means for locking said selective means except when the counter and operating elements are moved out of connection with each other at the end of a transaction.

13. In an adding machine, a movable carriage with a counter system thereon, a counter operating element, selective means for controlling the direction of actuation of the said element, and means for locking the selective means except when the counter system has been moved out of operative relation with the counter operating element.

JOHN P. HARRISON, Jr.

Copies of this patent may be obtained for five cents each, by addressing the "Commissioner of Patents, Washington, D. C."